(12) United States Patent
Lee et al.

(10) Patent No.: US 7,319,334 B2
(45) Date of Patent: Jan. 15, 2008

(54) APPARATUS AND METHOD OF INSPECTING BREAKDOWN OF CONDUCTING WIRE

(75) Inventors: Seung Min Lee, Yongin-si (KR); Dae Hwa Jeong, Osan-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/130,279

(22) Filed: May 17, 2005

(65) Prior Publication Data

US 2005/0258836 A1    Nov. 24, 2005

(30) Foreign Application Priority Data

May 18, 2004    (KR)    ............... 10-2004-0035287

(51) Int. Cl.
*G01R 31/02* (2006.01)
*G01R 31/28* (2006.01)

(52) U.S. Cl. ............... 324/530; 324/528; 324/457

(58) Field of Classification Search ............ 324/530, 324/457, 528
See application file for complete search history.

(56) References Cited

U.S. PATENT DOCUMENTS

| | | | |
|---|---|---|---|
| 4,659,991 A * | 4/1987 | Weischedel | 324/241 |
| 4,758,792 A * | 7/1988 | Polonis et al. | 324/552 |
| 6,188,226 B1 * | 2/2001 | Ochiai | 324/458 |
| 2002/0180455 A1* | 12/2002 | Okano et al. | 324/530 |
| 2003/0016026 A1* | 1/2003 | Kawaike et al. | 324/537 |
| 2004/0095144 A1* | 5/2004 | Yamaoka et al. | 324/530 |

FOREIGN PATENT DOCUMENTS

| | | |
|---|---|---|
| JP | 2000292473 A | 10/2000 |
| KR | 2001-0022424 | 3/2001 |
| KR | 2001-0111969 A | 12/2001 |
| WO | WO-2004/076966 A1 | 10/2004 |

* cited by examiner

*Primary Examiner*—Anjan Deb
*Assistant Examiner*—John Zhu
(74) *Attorney, Agent, or Firm*—Birch, Stewart, Kolasch & Birch, LLP

(57) ABSTRACT

A breakdown inspection apparatus for a wire includes a power supply applying a voltage to the wire and an electric field sensor detecting an electric field generated around the wire by the applied voltage so as for a user to determine according to variation of the electric field if there is an open defect in the wire.

15 Claims, 4 Drawing Sheets

APPARATUS AND METHOD OF INSPECTING BREAKDOWN OF CONDUCTING WIRE

BACKGROUND OF THE INVENTION

1. Field of the Invention

The present invention relates to apparatus and method for inspecting breakdown of a conducting wire, and more particularly, to apparatus and method for determining if there is any defective wire among a plurality of wires arranged in parallel with each other and detecting an open location of the defective wire.

2. Description of the Related Art

In recent years, a technology of a flat panel display has been quickly advanced. Such a flat panel display is provided with a matrix grid. To form the matrix grid, a wire patterning process is essentially performed. A defect incurred during the wire patterning process affects on the yield of the display devices. Particularly, as the screen size of the display is increased, the open defect of the wires defining the matrix grid may be further increased, greatly affecting on the yield of the display devices.

Therefore, non-destructive testing has been performed for such a display or a printed circuit board (PCB). The non-destructive testing is performed to detect the defect by forming AC electric field around a metal object and measuring local variation of the electric field, the local variation being incurred by an eddy current induced to a boundary surface of the metal. Magnetic resistance, a coil, flux gate, and the like may be used as a sensor for detecting the variation of the electric field. Particularly, when a squid that is a superconducting quantum interference device is used, it becomes possible to detect a fine defect or a defect incurred on a location remote from a surface.

The above-described prior non-conductive testing using the eddy current is designed to demodulate a signal detected by a magnetic sensor by performing a two-dimensional scanning process and measure intensity of the modulated signal.

When an AC electric field having uniform amplitude is applied, a part of the electric field is shielded by the eddy current induced to the metal surface or a boundary surface of the metal, as a result of which the amplitude of the electric field is reduced. Therefore, by detecting the reduced amount of the amplitude, an eddy current shape corresponding to the actual shape of the metal is obtained. At this point, when there is a defect in the metal object, a local eddy current shape is obtained. This local eddy current shape has been analyzed using an electric field detecting sensor, a coil generating a uniform or local AC electric field, a signal generator and a lock-in amplifier measuring an rms or a peak-to-peak value from a signal of the sensor or other peak detectors.

Therefore, it becomes possible to detect a short circuit location between electrodes by detecting an abnormal signal generated at a breakdown portion without physically affecting on the test object. Such a non-destructive testing method using the magnetic sensor is well known in the art.

However, an open circuit test is conducted by flowing an AC current or by measuring a signal transmission failure caused by a capacitive coupling.

Since a panel has capacitive components itself to define an RC network, signal attenuation is growing more and more serious, the frequency property may be varied according to a model.

Particularly, when the signal transmission is measured by the capacitive coupling, a desired signal is obtained only when the wires are well aligned. The cost for making the measuring apparatus is increased due to the mechanical restriction conditions.

In addition to the above-described methods, the open test may be conducted using a magnetic detecting method using an electro-optic sensor. Although this method may be usefully applied to a variety of fields, it takes relatively long time to approach the surface of the test object.

Particularly, when the test object is large-sized, since the approach should be repeatedly performed, the total testing time is remarkably increased.

SUMMARY OF THE INVENTION

Accordingly, the present invention is directed to apparatus and method of inspecting breakdown of a conducting wire that substantially obviates one or more problems due to limitations and disadvantages of the related art.

An object of the present invention is to provide apparatus and method of inspecting breakdown of a conducting wire, which can quickly inspect a wire-open of conductive wires formed on a panel through a non-contacting manner.

Another object of the present invention is to provide apparatus and method of inspecting breakdown of a conducting wire, which can quickly find out a defective wire among a plurality of wires and an open location of the defective wire.

Still another object of the present invention is to provide apparatus and method of inspecting breakdown of a conducting wire, which can quickly detect if there is a defective wire through a non-contact manner.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a breakdown inspection apparatus for a wire, including: a power supply applying a voltage to the wire; and an electric field sensor detecting an electric field generated around the wire by the applied voltage so as for a user to determine according to variation of the electric field if there is an open defect in the wire.

In another aspect of the present invention, there is provided a breakdown inspection method for a wire, including: applying voltage to the wire; and detecting a wire defect by obtaining an electric field distribution by scanning the wire using an electric field sensor.

In still another aspect of the present invention, there is provided a breakdown inspection apparatus for a plurality of wires, including: a power supply applying a voltage to the wires; and a first electric field sensor detecting an electric field generated around the wires by the applied voltage by scanning the wires in a direction crossing the wires so as for a user to determine according to variation of the electric field if there is an open defect in the wire.

In a still yet another aspect of the present invention, there is provided a breakdown inspection method for a plurality of wires, including: scanning an electric field in a direction crossing a longitudinal direction of the wires to which a voltage is applied; and determining that a wire where a first different pattern formed by an electric field distribution that is differently varied is generated is regarded as a defective wire having an open defect.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
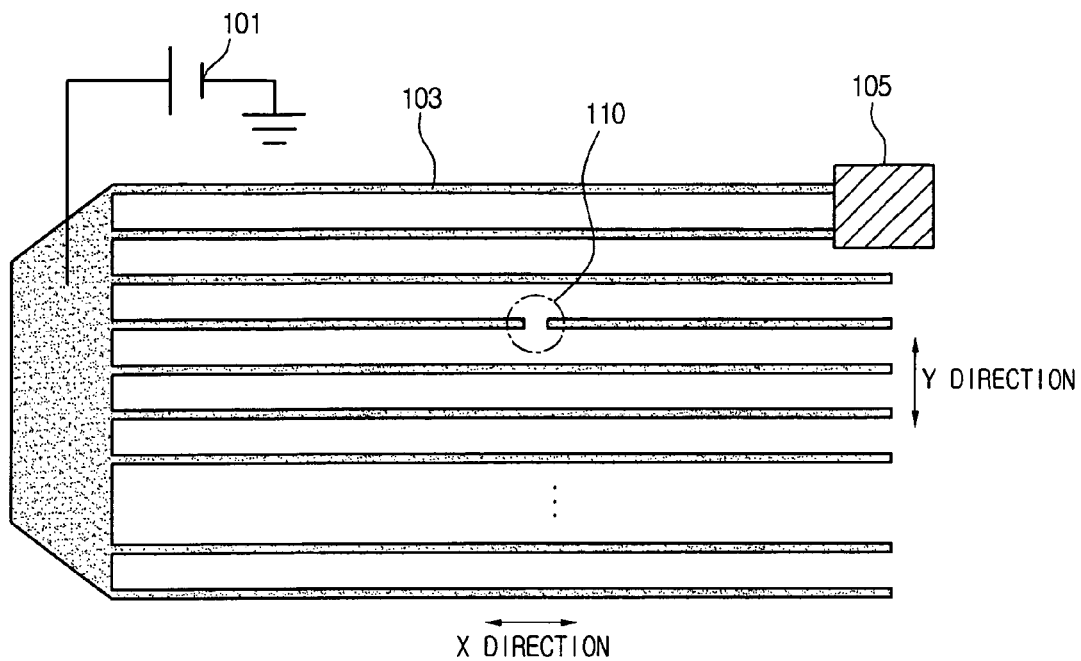
FIG. 1 is a schematic view of a breakdown inspection apparatus for a conducting wire according to an embodiment of the present invention.

FIG. 1 schematically shows a breakdown inspection apparatus of a conducting wire according to an embodiment of the present invention.

Referring to FIG. 1, the inventive breakdown inspection apparatus includes a power supply 101 applying a DC voltage to conductive wires 103 arranged in parallel with each other on a test panel and an electric field sensor 105 detecting an electric field signal generated by the voltage applied to the wires 103.

The test panel may be a display panel on which a plurality of wires to which electric power is applied are arranged in parallel with each other. For example, the panel may be a liquid crystal display (LCD) panel or a plasma display panel (PDP) panel. The wires 103 may be formed in a wire pattern applicable to the display device.

Each of the wires has a first end connected to the power supply 101 and a second end on which the electric field sensor 105 is disposed in a non-contact state.

The operation of the above-described breakdown inspection apparatus will be described hereinafter.

When a DC voltage is applied from the power supply 101 to the wires 103, an electric field is formed around the wires 103. In this state, when the electric sensor 105 scans the wires in a direction (a y-direction) crossing the longitudinal directions of the wires 103, an electric field distribution in the form of a graph periodically repeated can be obtained. Using the graph, it can be determined if there is an open defect in the wires.

That is, the wires 103 are patterned in an x-direction and the electric field sensor scans the wires in the y-direction perpendicular to the x-direction. At this point, in a first inspection, the electric field sensor 105 scans the wires in a state where it is located on the second ends of the wires and the DC voltage is applied to the first ends of the wires. By doing this, it becomes possible to identify if there is any breakdown such as the open defect in the wires.

When the electric field sensor 105 scans the wires, a predetermined electric field signal is detected by the electric field sensor 105. At this point, since a specific attenuation signal pattern is generated at an open location 110 of the wires 103, it can be determined by the attenuation signal pattern if there is an open defect in the wires 103.

Figure 2:
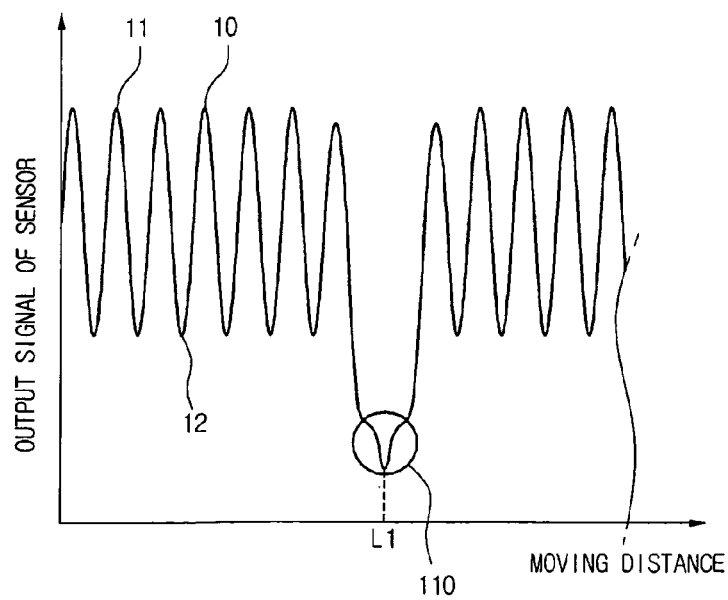
FIG. 2 is a graph illustrating an output signal of an electric field sensor when wires on a panel is scanned by the electric field sensor of a breakdown inspection apparatus according to an embodiment of the present invention.

FIG. 2 shows a graph illustrating an output signal of an electric field sensor when a panel is scanned by a breakdown inspection apparatus depicted in FIG. 1.

In FIG. 2, a horizontal axis indicates a moving distance of the electric field sensor 105 and a vertical axis indicates a sensor output signal of the electric field sensor 105.

Referring to FIG. 2, the output of the electric field sensor is formed in a sine wave according to a scanning direction of the electric field sensor 105.

At this point, in the graph, peaks are output signals corresponding to peak values 10 appearing when the electric field sensor 105 passes right above the wires 103 and valleys are output signals corresponding to valley values 12 appearing when the electric field sensor 105 passes right above areas defined between the wires 103. That is, as the electric field sensor 105 becomes closer to the wires 103, an electric field detected by the electric field sensor 105 is increased.

Therefore, when there is an open defect in any of the wires 103 and the electric field sensor 105 scans the wires in a direction crossing the longitudinal directions of the wires having the open defect, i.e., when the electric field sensor 105 reaches a location L1, the signal outputted from the electric field sensor 105 is attenuated to represent the valley value 12.

In addition, it is preferable that the electric field sensor 105 is located on the second ends of the wires. When a size of the test panel is varied, it is preferable that the location where the electric field sensor 105 is varied. That is, when the size of the test panel is enlarged, the electric field sensor 105 should be scan the wires from an end of each wire 103 in the y-direction so as to find out a wire having a defect regardless of a location where the open defect 110 is located.

As described above, when the electric field sensor 105 scans the wires in a direction crossing the longitudinal directions of the wires 103, the wire 103 having the open defect 110 can be exactly identified. However, the location of the open defect 110 in the wire 103 cannot be exactly identified. That is, although it can be determined by identifying the wire having the open defect if the test panel is defective or not, the exact location of the open effect in the wire 103 cannot be identified.

A process of determining the exact location of the open defect will be described hereinafter.

Figure 3:
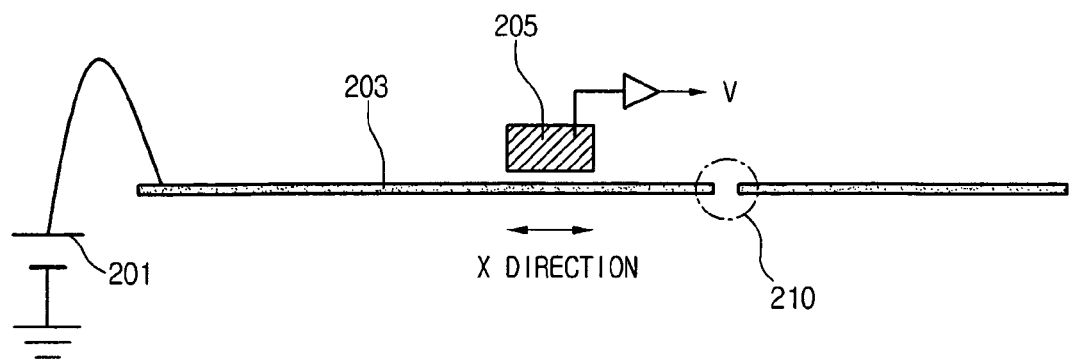
FIG. 3 is a view illustrating a process for finding out a location of an open defect in a defective wire using a breakdown inspection apparatus depicted in FIG. 1.

FIG. 3 illustrates a process of identifying an open location as a relative location with respect to a wire using a breakdown inspection apparatus according to an embodiment of the present invention.

Referring to FIG. 3, the defective wire 203 having the open defect 210 is first identified using the inventive breakdown inspection apparatus, the electric field sensor performs its scanning operation again only for the defective wire 203 in a state where the power supply 201 is connected to one end of the defective wire 203, thereby finding out the exact location of the open defect 210 in the defective wire 203.

Describing in more detail, as can be noted from FIGS. 1 and 2 and the description thereof, the defective wire having the open defect can be detected by the scanning operation in the y-direction for the wires.

Then, the DC voltage is applied to the detected defective wire by the power supply 201. In this state, when the detected defective wire 203 is scanned by the electric sensor 205 in the x-direction, the signal is attenuated at the open location of the defective wire 203, thereby exactly identifying the location where the open defect 210 is formed. That is, after the defective wire having the open defect 110 is first detected by the first scanning operation in the y-direction in FIG. 1, the secondary scanning operation is performed for the defective wire in the x-direction in FIG. 1, thereby finding out the exact location of the open defect in the defective wire.

However, there is no need of consecutively performing the first and secondary scanning operations. That is, one of the scanning operations may be performed using naked eyes while the other is performed using the electric field sensors 105 and 205.

For example, the first scanning operation is performed using the electric field sensor 105, the secondary scanning operation may be performed using other visual inspections such as inspection with photograph, inspection with naked eyes, inspection with X-ray photo, and the like.

Figure 4:
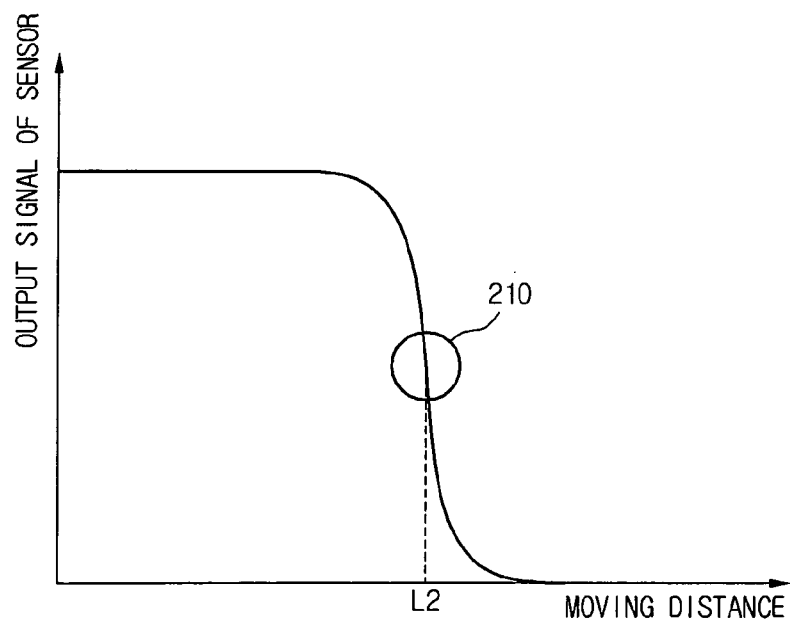
FIG. 4 is a graph illustrating an output signal of an electric field sensor when a defective wire with an open defect is secondarily scanned by the electric field sensor of a breakdown inspection apparatus depicted in FIG. 1.

FIG. 4 shows a graph illustrating an output signal of the electric field sensor when the defective wire with the open defect is secondarily scanned by an electric field sensor of the breakdown inspection apparatus depicted in FIG. 1.

In FIG. 4, a horizontal axis indicates a moving distance of the electric field sensor 205 while a vertical axis indicates an output of the electric field sensor 205.

Referring to FIG. 4, it can be noted that, when the electric field sensor 205 passes above the open defect 210, the output signal is steeply reduced. That is, while the electric field sensor 205 moves in the x-direction, the electric field appears at an area adjacent to the wire 203. However, the moment the electric field sensor 205 passes above a location L2 adjacent to the open defect 210, an output signal of the electric field sensor 205 is disappeared. Therefore, it can be possible to set the location L2 as the location where the open defect 210 is incurred.

However, as described above, the secondary scanning operation may be performed using the visual inspection method.

Figure 5:
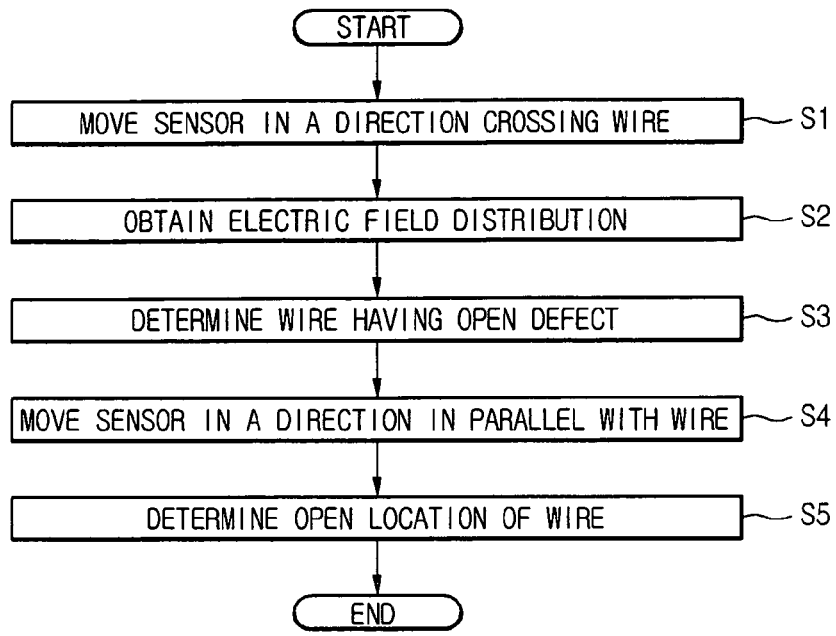
FIG. 5 is a flowchart illustrating a breakdown inspection method for a conducting wire according to an embodiment of the present invention.

FIG. 5 shows a flowchart illustrating a breakdown inspection method for a conducting wire according to an embodiment of the present invention.

Referring to FIG. 5, a first scanning operation is performed for wires in a direction crossing the longitudinal directions of the wires in a state where a DC voltage is applied to the wires (S1). An electric field distribution graph for the wires is obtained by the first scanning operation (S2). A defective wire having an open defect is detected by analyzing the electric field distribution graph (S3).

In the defective wire, the electric field is generated by the DC voltage in a first section defined from a first end to which the voltage is applied to a portion where the open defect is formed. However, the electric field is not generated in a second section defined from the portion where the open defect is formed to a second end as the voltage is not applied thereto. This makes it possible to detect the defective wire having the open defect. That is, by scanning the second sections of the wires using the electric field sensor, it can be identified if there is the open defect in the wire according to whether the electric field is generated on the second section.

After the defective wire is detected, a secondary scanning operation is performed only for the defective wire. The secondary scanning operation is performed by moving the electric field sensor in a direction in parallel with the defective wire (S4).

In the secondary scanning operation, the electric field is generated by the DC voltage in a third section defined from a first end to which the voltage is applied to a portion where the open defect is formed. However, the electric field is not generated in a fourth section defined from the portion where the open defect is formed to a second end as the voltage is not applied thereto. Therefore, a boundary portion between the third and fourth sections becomes a location where the open defect is incurred.

That is, it is determined that the boundary portion between the third and fourth sections becomes a location where the open defect is incurred (S5).

However, as described in the forgoing description, the secondary scanning may be performed using the visual inspection method.

Figure 6:
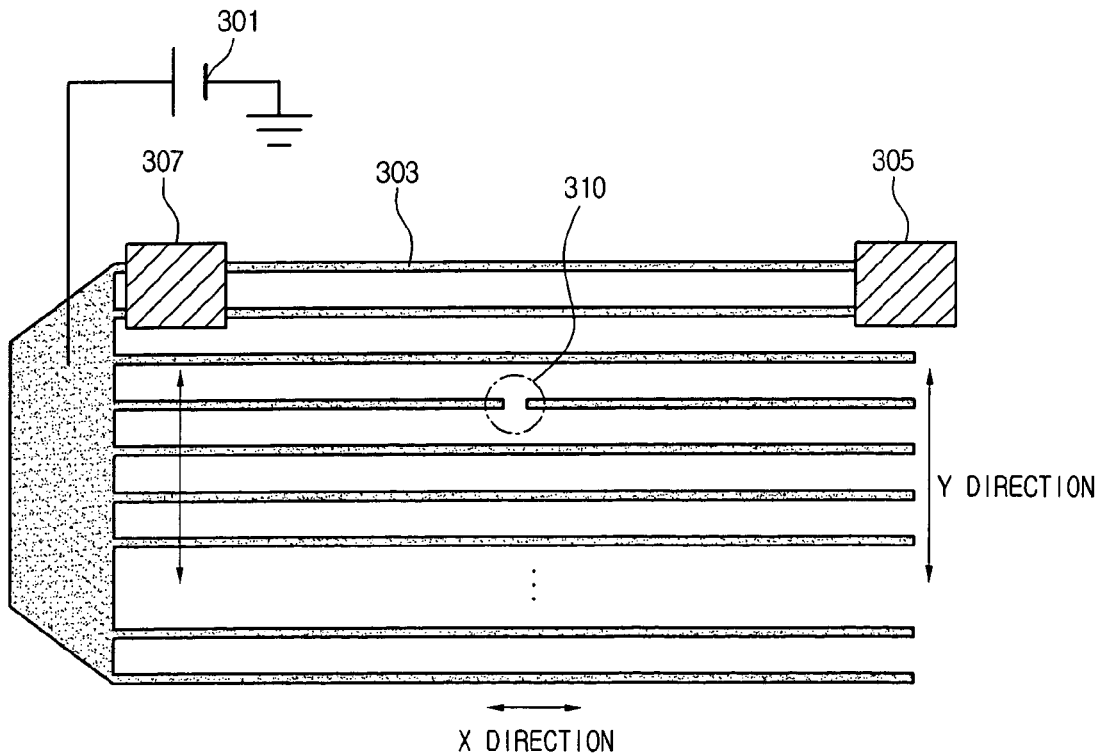
FIG. 6 is a schematic view of a breakdown inspection apparatus for a conducting wire according to another embodiment of the present invention.

FIG. 6 shows a breakdown inspection apparatus for a conducting wire according to another embodiment of the present invention.

Referring to FIG. 6, this embodiment is identical to the foregoing embodiment except that two electric field sensors are used. That is, a breakdown inspection apparatus of this embodiment includes a power supply 301 applying a DC voltage to conductive wires 303 arranged in parallel with each other on a test panel and first and second electric field sensors 305 and 307 detecting an electric field signal generated by the voltage applied to the wires 303.

That is, the wires 303 are patterned on the test panel in an x-direction and the first and second electric field sensors 305 and 307 scan the wires in a y-direction perpendicular to the x-direction.

The power supply 301 is connected to first ends of the wires 303 to supply a DC voltage to the wires 303, thereby forming an electric field around the wires 303. The electric field generated around the wires 303 is detected by the first and second electric field sensors 305 and 307. Particularly, the electric field is detected by both of the first and second electric field sensors 305 and 307.

The second electric field sensor 307 scans the wires 303 at first ends of the wires 303, which are connected to the power supply 301, in the y-direction crossing the longitudinal directions of the wires 303. The first electric field sensor 305 scans the wires at second ends of the wires 303 in the y-direction crossing the longitudinal directions of the wires 303.

The open defect of the wires 303 is identified at a location between the first and second electric field sensors 305 and 307.

Therefore, in the wires where no open defect is formed, when the voltage value of the first electric field sensor 305 is subtracted from the voltage value of the second electric field sensor 307, the subtracted voltage value becomes 0. However, in the wire having the open defect, the predetermined subtracted value is calculated.

Figure 7:
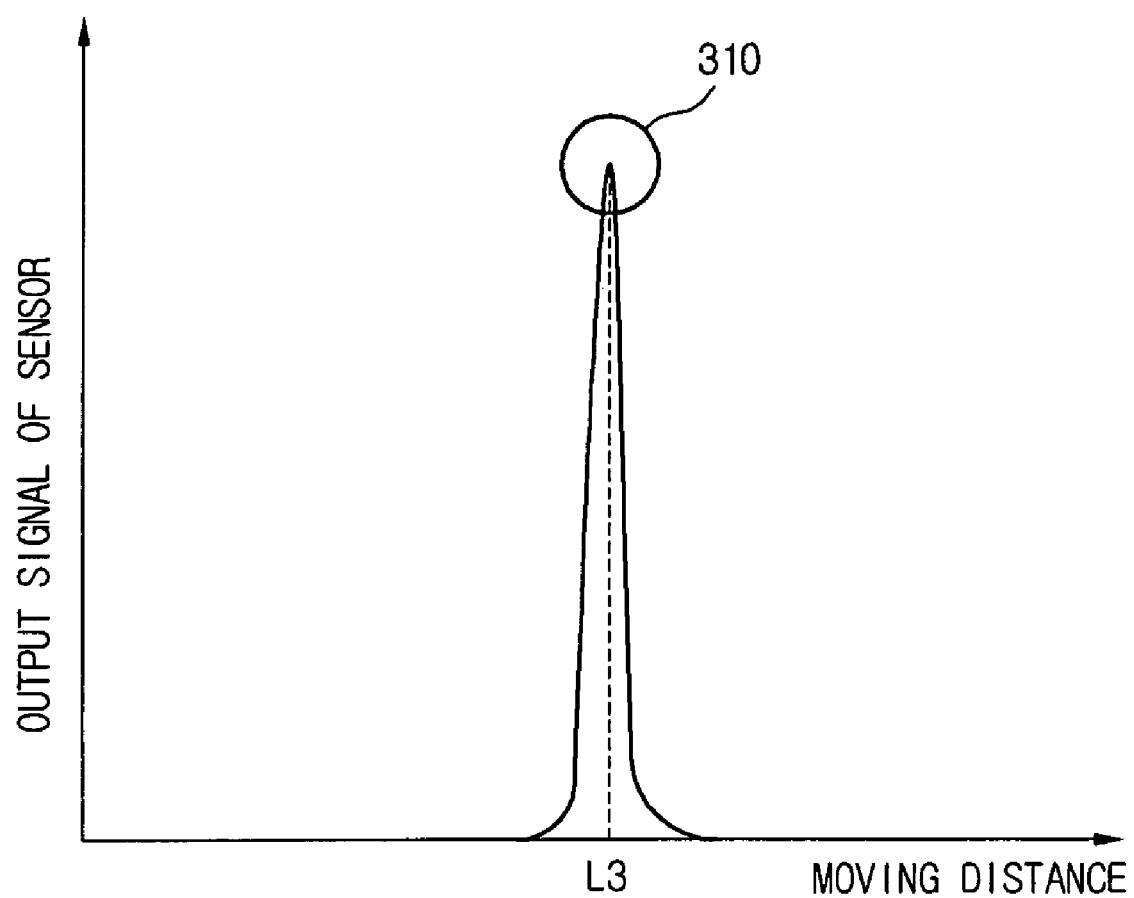
FIG. 7 is a graph illustrating output signals of electric field sensors when wires on a panel are scanned by the electric field sensors of a breakdown inspection apparatus depicted in FIG. 6.

FIG. 7 shows a graph illustrating output signals of the respective first and second electric field sensors when the wires on the panel are scanned by the first and second electric field sensors of the breakdown inspection apparatus depicted in FIG. 6.

Referring to FIG. 7, when the signal outputted from the second electric field sensor 307 is subtracted from the signal outputted from the first electric field sensor 305, only a signal at a location where the open defect 310 is formed is detected. Therefore, it becomes possible to determine if there is a wire having the open defect according to simply whether the signal is generated or not. That is, there is no need of continuously objecting the variation of the output signal as in the foregoing embodiment. Therefore, the user can more conveniently use the apparatus.

In addition, when it is determined there is the wire having the open defect, the secondary scanning operation is performed or other visual inspection is performed to accurately fine out the location where the open defect is formed in the wire.

Alternatively, it is also possible to use more than three electric field sensors to scan the wires. In this case, since the specific section where the breakdown of the wire is incurred can be identified, the breakdown point of the wire can be more accurately detected. That is, the open defect can be detected by specific sections between a pair of electric field sensors, the visual inspection can be more effectively performed after the first scanning operation.

According to the present invention, a plurality of wires formed on the test panel are scanned by the electric field sensor in a state where the DC voltage is applied to the wires, the open defect can be quickly detected. Therefore, the effective yield management becomes possible through the entire visual inspection between the processes.

Furthermore, since the inventive breakdown inspection apparatus is designed in a simple structure and the inspection method becomes simplified, even when the size of the panel is changed, the inspection can be effectively realized by simply changing the location of the electric field sensor.

In addition, the breakdown location of the wire can be more accurately identified.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A breakdown inspection apparatus for a wire, comprising:
    a power supply applying a DC voltage to the wire;
    an electric field sensor detecting an electric field generated around the wire by the applied DC voltage so as for a user to determine according to a variation of the electric field if there is an open defect in the wire,
    wherein the breakdown inspection apparatus is configured to determine the open defect by determining an atypical variation of the electric field while the electric field sensor scans the wire; and
    a second electric field sensor also detecting the electric field generated around the wire,
    wherein the electric field sensor and the second electric field sensor are arranged in parallel with each other and spaced away from each other so as to find the open defect by subtracting an intensity of the electric field sensed by the electric field sensor from an intensity of the electric field sensed by the second electric field sensor.

2. The breakdown inspection apparatus according to claim 1, wherein the wire is patterned for a display panel.

3. The breakdown inspection apparatus according to claim 1, wherein the power supply is connected to a first end of the wire.

4. The breakdown inspection apparatus according to claim 1, wherein the power supply and the electric field sensor are respectively disposed on first and second ends of the wire.

5. The breakdown inspection apparatus according to claim 1, wherein the electric field sensor and the second electric field sensor scan the wire in a direction crossing a longitudinal direction of the wire.

6. The breakdown inspection apparatus according to claim 1, wherein the wire is one of two wires and the power supply is designed to simultaneously apply the DC voltage to all of the wires.

7. A breakdown inspection apparatus for a wire, comprising:
    a power supply applying a DC voltage to the wire;
    an electric field sensor detecting an electric field generated around the wire by the applied DC voltage so as for a user to determine according to a variation of the electric field if there is an open defect in the wire,
    wherein the breakdown inspection apparatus is configured to determine the open defect by determining an atypical variation of the electric field while the electric field sensor scans the wire; and
    a second electric field sensor also detecting the electric field generated around the wire,
    wherein the electric field sensor and the second electric field sensor are respectively disposed on at least opposite ends of the wire so as to find the open defect by subtracting an intensity of the electric field sensed by the electric field sensor from an intensity of the electric field sensed by the second electric field sensor.

8. A breakdown inspection method for a wire, comprising:
    applying a DC voltage to the wire; and
    detecting a wire defect by obtaining an electric field distribution by scanning the wire using an electric field sensor,
    wherein the step of detecting the wire defect comprises subtracting an output value from the electric field sensor from an output value from a second electric field sensor that simultaneously scans the same wire.

9. The breakdown inspection method according to claim 8, wherein the electric field sensor and the second electric field sensor scan electric fields on opposite ends of the wire to detect a defective wire.

10. The breakdown inspection method according to claim 8, wherein three electric field sensors are used to scan the wire in a direction crossing the wire to detect a defective area of the wire.

11. A breakdown inspection apparatus for a plurality of wires, comprising:
    a power supply applying a DC voltage to the wires;
    an electric field sensor detecting an electric field generated around the wires by the applied DC voltage by scanning the wires in a direction crossing the wires so as for a user to determine according to a variation of the electric field if there is an open defect in the wire,
wherein the breakdown inspection apparatus is configured to determine the open defect by determining an atypical variation of the electric field while the electric field sensor scans the wire; and
a second electric field sensor also detecting the electric field generated around the wires,
wherein the electric field sensor and the second electric field sensor are disposed on at least opposite ends of the wires so as to find the open defect by subtracting an intensity of the electric field sensed by the electric field sensor from an intensity of the electric field sensed by the second electric field sensor.

12. The breakdown inspection apparatus according to claim 11, wherein the electric field sensor and the power supply are respectively disposed on opposite ends of the wires.

13. The breakdown inspection apparatus according to claim 11, wherein the electric field sensor and the second electric field sensor perform the scanning operating while moving in a direction in parallel with a longitudinal direction of the wires.

14. A breakdown inspection method for a plurality of wires, comprising:
scanning an electric field in a direction crossing a longitudinal direction of the wires to which a DC voltage is applied using first and second electric field sensors;
determining that a wire where a first different pattern formed by an electric field distribution that is differently varied is generated is regarded as a defective wire having an open defect wherein the determining operation compares an intensity of the electric field sensed by the first electric field sensor with an intensity of the electric field sensed by the second electric field sensor; and
after the determining operation, scanning the electric field in a direction in parallel with a longitudinal direction of the defective wire and determining that a location where a second different pattern is generated is a defective location.

15. The breakdown inspection method according to claim 14, wherein the second different pattern is an electric field reduction.

* * * * *